A. MICHELIN.
RIM OF WHEELS AND MEANS FOR TEMPORARILY SECURING A PNEUMATIC TIRE THERETO.
APPLICATION FILED MAR. 9, 1909.
965,593.
Patented July 26, 1910.
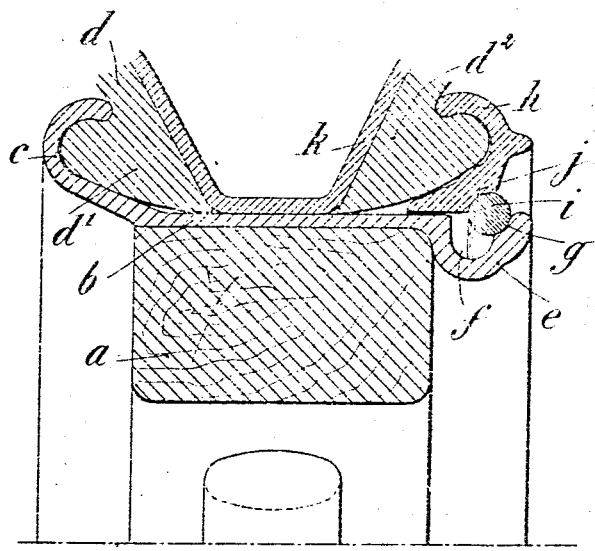
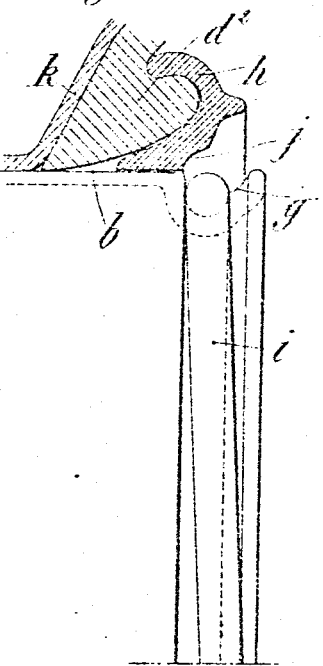
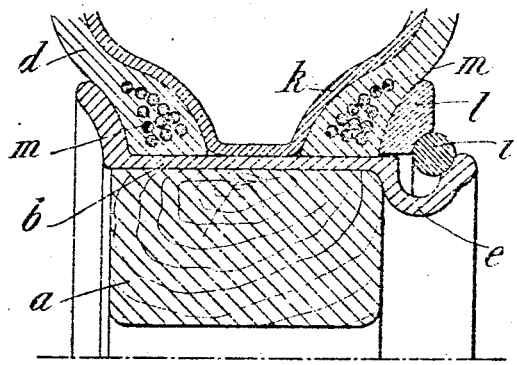
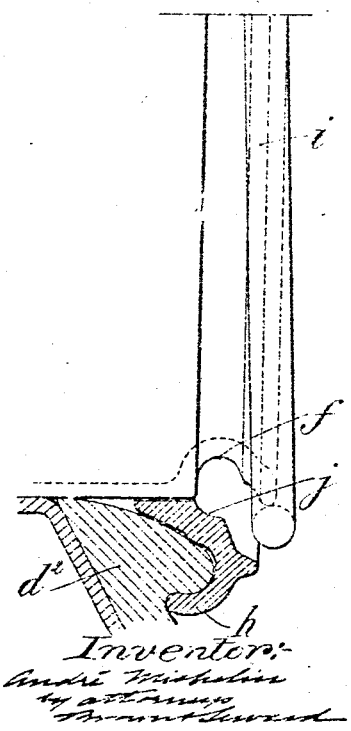
Witnesses:
Inventor:
André Michelin

UNITED STATES PATENT OFFICE.

ANDRÉ MICHELIN, OF PARIS, FRANCE.

RIM OF WHEELS AND MEANS FOR TEMPORARILY SECURING A PNEUMATIC TIRE THERETO.

965,593.

Specification of Letters Patent. Patented July 26, 1910.

Application filed March 9, 1908. Serial No. 419,835.

*To all whom it may concern:*

Be it known that I, ANDRÉ MICHELIN, citizen of the Republic of France, and resident of 105 Boulevard Péreire, Paris, in the said Republic, engineer, have invented a new and useful Improvement in the Rims of Wheels and in the Means Employed for Temporarily Securing Pneumatic Tires Thereto, of which the following is a specification.

The invention relates to improvements in the rims of wheels for automobiles or other vehicles, and it has for its object the very rapid replacement of the pneumatic tire carried on a wheel, without any need of removing the body of the rim and by simply removing two rings which maintain such tire in position.

The invention consists essentially in providing the wheel, whether of wood or metal, with a stationary metallic rim which on one side only (the side adjacent to the vehicle) is provided with an edge serving to hold one of the edges of the outer cover of the tire, while on the other side it receives a removable ring sufficiently large in diameter to be able to slide thereon, which ring serves to hold the other edge of the cover, such rim having moreover on the exterior face of the wheel, a special section in order to receive a second ring serving to secure the first and, consequently, the tire, by the aid of the air pressure contained in this latter.

Figure 1 of the accompanying drawings is a transverse section of a rim constructed according to the invention. Fig. 2 is a vertical section of a complete wheel, fitted with such a rim, showing the method of placing the second or securing ring in position. Fig. 3 is a transverse section of a modified form of rim applicable to a tire the edges of which are non-extensible or very slightly extensible.

*b* Fig. 1 is a steel rim encircling the wooden rim or felly *a* of a wheel and having, on the face of the wheel adjacent to the vehicle, an edge *c* serving to secure the bead *d'* of the outer cover *d* of the tire, while on the other face of the wheel it presents a channel *e* the edge of which is of a diameter equal to or slightly less than the exterior diameter of the rim *b*. The recess or hollow of this channel is composed of two parts: at the bottom, a semicircular groove *f*, and above the latter a concave rest or seat in the form of a quarter circle *g*. This seat however is not absolutely necessary. In order to secure the tire on this rim, an endless ring *h*, of hook form, which engages the second bead *d²* of the tire is slipped over it, and this first ring in its turn is retained in position by a ring *i* which is inextensible and endless and which the pressure of the tire holds between the seat in the form of a quarter circle *g* of the rim and a similar seat *j* formed in the ring *h*. This lock ring *i* is of circular section and at the center should be of approximately the exterior diameter of the rim.

The following is the operation of fixing the tire on the wheel. After placing the air chamber *k* within the cover, the beads of the latter are slipped over the rim, then in the same manner the first ring *h* is slipped over until it occupies the position indicated in Fig. 2; then the ring *i* is placed in position. For this purpose, it is caused to rest in the bottom of the channel *e* at one point in the circumference of the wheel, so that at the diametrically opposite point this ring can pass over the edge of the channel, as will be seen at the bottom of Fig. 2, an operation which the form of the rings *h* and *i* permits of being completely effected. This having been done, the two rings are allowed to return to position, and the second (*i*) will become centered between the seat in the form of a quarter circle *g* and the seat *j*. The inflation of the pneumatic tire maintains the system in this position with great security.

In the modification illustrated in Fig. 3, the only alteration consists in the replacement of the ring *h* above described by a ring *l* the section of which corresponds to the different form of the edges of the cover of the tire. These edges are represented as being provided with interior metallic wires *m*, but any other suitable means may be employed for rendering them non-extensible or but very slightly extensible, and the invention does not relate to the means for obtaining this result, but only to the construction of the rim and the parts serving to secure the tire thereto, in a removable manner.

What I claim as my invention, and desire to secure by Letters Patent, is:—

A vehicle wheel rim constituting a seat for a tire and provided at one side with a tire retaining edge of greater diameter than the rim and at the other side with an annular channel of less diameter than the rim, an annular seat of greater diameter than the channel formed in the rim adjacent to the said channel and in a plane on the opposite side of the channel from the wheel, a ring fitted to removably engage said rim and the tire thereon, an annular seat in said ring of greater diameter than the wheel rim and lying in a plane intermediate of the planes of the channel and seat in the rim and an inextensible endless locking ring adapted to rest loosely in said channel when not in use and to engage both of said seats when in use for locking the tire on the rim.

In testimony, that I claim the foregoing as my invention, I have signed my name in presence of two witnesses, this 28th day of February 1908.

ANDRÉ MICHELIN.

Witnesses:
H. C. COXE,
ALCIDE FABE.